Aug. 15, 1967  L. B. SWANSON  3,335,836
ACCUMULATOR FOR CLUTCH ACTUATING PISTONS
Filed March 7, 1966
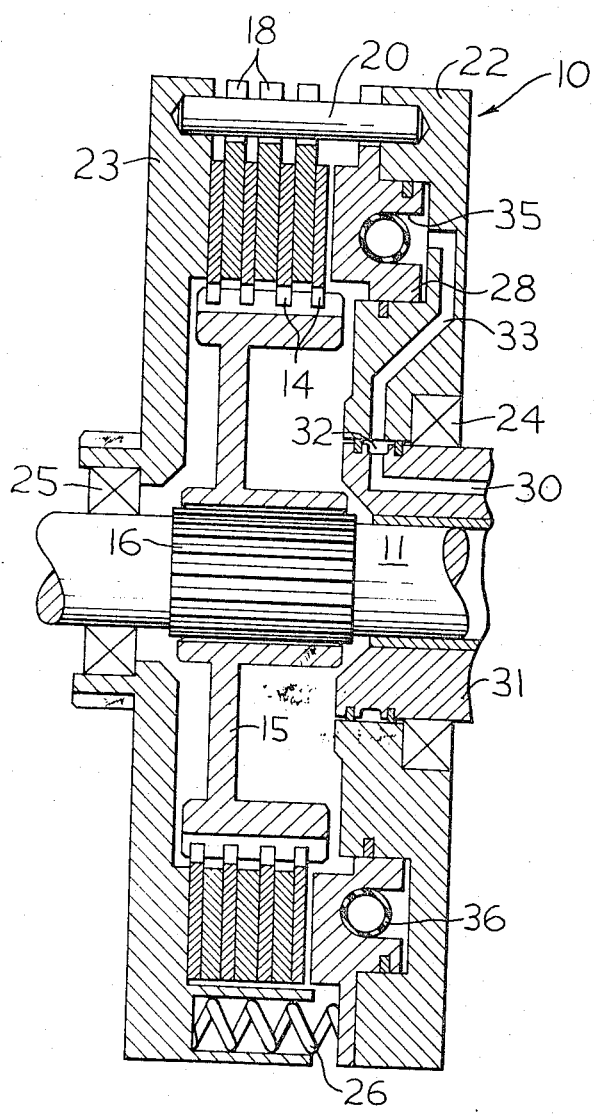
Fig-1-
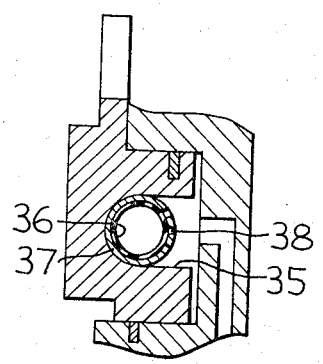
Fig-2-
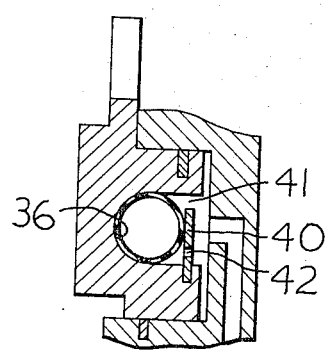
Fig-3-
INVENTOR.
LAWRENCE B. SWANSON
BY
*Frazer, Ejunvold, Feix & Phillips*
ATTORNEYS

# United States Patent Office 3,335,836
Patented Aug. 15, 1967

3,335,836
ACCUMULATOR FOR CLUTCH ACTUATING PISTONS
Lawrence B. Swanson, Peoria, Ill., assignor to Caterpillar Tractor Co., Peoria, Ill., a corporation of California
Filed Mar. 7, 1966, Ser. No. 532,429
4 Claims. (Cl. 192—85)

This invention relates to clutches or brakes which are hydraulically actuated and particularly to clutches and brakes of the disc-type wherein modulation of engaging pressure is necessary to obtain smooth operation.

Disc-type clutches and brakes with an annular piston are widely used in modern hydraulically controlled transmissions and it is necessary to provide accumulators and special valving to obtain smooth operation of such devices. Modulators and special valving used in the hydraulic lines remote from the discs of the clutch or brake have in many cases been found inadequate and resort has been made to the use of resilient mechanisms in the immediate vicinity of the stack of friction discs which produce the braking or clutching effect. It is to improvements in such vibration preventing devices or pressure surge absorbing devices that the present invention is directed.

It is the object of the present invention to provide a simple, inexpensive and trouble-free device for preventing chatter in hydraulically actuated clutches and brakes and particularly preventing chatter during the low pressure phase when engaging pressure is being introduced and also to provide means to aid smooth quiet engagement.

Further and more specific objects and the manner in which the invention is carried into practice are made apparent in the following specification by reference to the accompanying drawing.

In the drawing:

FIG. 1 is a central sectional schematic view of a clutch embodying the present invention; and FIGS. 2 and 3 are fragmentary sectional views illustrating modifications of the invention disclosed in FIG. 1.

In the ensuing description, the term "clutch" will be used as meaning either clutch or brake as the two devices are equally benefitted by the present invention. FIG. 1 shows a disc-type clutch for transmitting power between a rotatable housing assembly generally indicated at 10 and a rotatable shaft 11. The shaft may be rotated as by the vehicle engine or the like and the housing assembly 10 may be connected by any suitable means (not shown) to some transmission element for rotating the same when desired. A stack of clutch discs is shown as comprising spaced discs 14 having splined connection with a hub member 15 which is in turn connected by splines 16 to the shaft 11. Intermediately positioned discs 18 have notches at their outer periphery embracing pins, one of which is shown at 20, connecting parts 22 and 23 of the housing assembly 10. Bearings 24 and 25 permit relative rotation of the shaft 11 and the housing assembly 10 and springs, one of which is shown at 26, normally urge the part 23 and an annular piston 28 toward separated positions which permits the discs 14 and 18 to slip or rotate freely with respect to each other. To impart pressure to the stack of discs and thereby cause the housing assembly to rotate with the shaft, the annular piston 28 is carried in an annular cylinder and hydraulic fluid under pressure from a suitable source is directed to the cylinder through a passage 30 in a stationary housing part 31 and thence by way of an annular groove 32 with said member to a passage 33 in the member 22.

The construction thus far described is conventional and the present invention resides in the provision of a simple and improved accumulator means disposed within the cylinder which contains the piston 28. The piston is provided with a large annular groove 35 and this groove receives a flexible annular tube 36. This tube is made of rubber or any suitable durable plastic material and is impervious and contains air or other gas at atmospheric or greater pressure. In operation when pressure is introduced to the cylinder, the compressibility of the gas within the tube absorbs shock or surging pressures which cause chattering as the discs 14 and 18 are brought into driving engagement with each other.

A simple toroidal-shaped tube snugly fitted within the groove 35 as shown in FIG. 1 will in many cases be adequate. However where there is any tendency for the tube to become dislodged so that it might be pinched upon movement of the piston, it can be protected as shown in FIG. 2 wherein a hollow metal torus 37 embraces the tube 36. The metal torus is provided with a plurality of perforations as indicated at 38 to permit the hydraulic fluid entering the cylinder to penetrate and act against the flexible tube 36.

An alternate method of protecting the tube 36 is shown in FIG. 3 wherein flat retaining members are employed for holding the tube in place. One such retaining member is shown at 40 and a plurality of such members may form a complete annulus when assembled in the position shown. Space 41, and if desired perforations 42, will enable free flow of hydraulic fluid to and from the area of the tube 36.

The tube 36 is described herein as having a toroidal form, however, this does not constitute a limitation since it may be a single long tube sealed at both ends and curved to fit the area provided for its reception. Alternately, many very short tubular containers could be fitted within the same area or many small flexible containers, even to the point of using a substance such as sponge rubber or the like. As to the position of the receptacle which receives the flexible container, it is shown herein as being within the movable piston, however, in some constructions the piston is of considerably smaller dimensions than herein shown and the compressible element could be disposed at any position within, or adjacent to, the cylinder in which the piston reciprocates.

I claim:

1. In a disc-type clutch in which engagement is caused by a piston comprising a stack of discs, a cylinder in which said piston is slidably received, means to direct fluid under pressure to the cylinder to cause compression of the stack of discs, and accumulator means to reduce shock transmitted from the hydraulic fluid to the stack comprising a sealed flexible container of gaseous fluid within the cylinder.

2. The combination of claim 1 in which the piston and cylinder are annular and the container is an annular torus.

3. The combination of claim 2 in which the piston has an annular groove on the side subjected to hydraulic pressure, and the container is disposed within the groove.

4. The combination of claim 3 with means to retain the container in the groove and admit hydraulic fluid to the groove.

References Cited
UNITED STATES PATENTS
2,588,724  3/1952  Hobbs et al. _____ 192—88
2,755,903  5/1955  Mc Aninch et al. _____ 192—85

BENJAMIN W. WYCHE, III, Primary Examiner.